US007889456B2

(12) United States Patent
Jiang et al.

(10) Patent No.: US 7,889,456 B2
(45) Date of Patent: Feb. 15, 2011

(54) PERPENDICULAR MAGNETIC RECORDING WRITE HEAD WITH FLUX SHAPING LAYERS ON THE WRITE POLE AND MAGNETIC RECORDING SYSTEM INCORPORATING THE WRITE HEAD

(75) Inventors: Ming Jiang, San Jose, CA (US); Changqing Shi, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 763 days.

(21) Appl. No.: 11/939,503

(22) Filed: Nov. 13, 2007

(65) Prior Publication Data

US 2009/0122445 A1    May 14, 2009

(51) Int. Cl.
*G11B 5/147* (2006.01)
(52) U.S. Cl. .............................. 360/125.08; 360/125.12
(58) Field of Classification Search ............ 360/125.08, 360/125.12, 125.24, 125.28
See application file for complete search history.

(56) References Cited

U.S. PATENT DOCUMENTS

| 6,884,148 | B1 | 4/2005 | Dovek et al. |
| 7,002,775 | B2 | 2/2006 | Hsu et al. |
| 7,140,095 | B2 | 11/2006 | Matono |
| 7,477,483 | B2* | 1/2009 | Kamada ................. 360/125.12 |
| 7,593,185 | B2* | 9/2009 | Yazawa ................. 360/125.28 |
| 2005/0219752 | A1 | 10/2005 | Takahashi |
| 2006/0164756 | A1* | 7/2006 | Kameda et al. ............. 360/125 |
| 2006/0168798 | A1 | 8/2006 | Naka |
| 2006/0215314 | A1 | 9/2006 | Chen |

* cited by examiner

*Primary Examiner*—A. J. Heinz
(74) *Attorney, Agent, or Firm*—Thomas R. Berthold

(57) ABSTRACT

A perpendicular magnetic recording write head having a flux shaping layer located on the write pole which has an end located substantially at the surface of the head carrier that faces the recording medium. The write head includes a main pole, on which the write pole is formed, that has an end recessed from the write pole end, and at least one flux return pole. In one implementation a first flux shaping layer is located between the main pole and the write pole. A second flux shaping layer may be located on the write pole with both shaping layers having an end recessed from the write pole end. The first and second flux shaping layers may also be tapered in the direction of the recording medium and cover the sides of the write pole in the cross-track direction to substantially surrounded the write pole with flux shaping material.

21 Claims, 11 Drawing Sheets

PERPENDICULAR MAGNETIC RECORDING WRITE HEAD WITH FLUX SHAPING LAYERS ON THE WRITE POLE AND MAGNETIC RECORDING SYSTEM INCORPORATING THE WRITE HEAD

BACKGROUND OF THE INVENTION

Field of the Invention

This invention relates generally to perpendicular magnetic recording systems, and more particularly to perpendicular magnetic recording write heads for use in magnetic recording disk drives.

Description of the Related Art

In a perpendicular magnetic recording system like a magnetic recording hard disk drive, the recorded bits are stored in a perpendicular or out-of-plane orientation in the recording layer. The recording or write head in perpendicular magnetic recording disk drives includes a main pole with a write pole tip for directing magnetic field to the recording layer, and one or more return poles for return of magnetic flux from the recording layer. The write pole must have a very narrow pole tip to achieve a narrow track width and thus high track density. The write pole must also be flared out into a larger flux-carrying body away from, but still relatively close to, the end of the write pole tip to achieve the required write field and write field gradient necessary for ultra-high density recording.

What is needed is a perpendicular magnetic recording write head that has improved conduction of flux from the main pole to the write pole tip.

SUMMARY OF THE INVENTION

The invention is a perpendicular magnetic recording write head that has at least one flux shaping layer located on the write pole. The write pole has an end located substantially at the surface of the head carrier that faces the recording medium. The write head includes a main pole, on which the write pole is formed, that has an end recessed from the write pole end, and at least one flux return pole. In one implementation a first flux shaping layer is located between the main pole and the write pole and has an end recessed from the write pole end. A second flux shaping layer, also with its end recessed form the write pole end, may be located on the write pole. The second flux shaping layer may also cover the sides of the write pole in the cross-track direction so that together with the first flux shaping layer, the write pole is substantially surrounded by flux shaping material. The ends of the flux shaping layers may be tapered in the direction of the recording medium to enhance directing and shaping the flux to the write pole end.

The write head may also have a trailing shield with an end generally coplanar with the write pole end and spaced from the write pole end in the along-the-track direction. The trailing shield may be connected to a return pole, and may have a surface that is tapered in the direction toward the recording medium. The write head may also have a leading shield with an end also generally coplanar with the write pole end and spaced from the write pole end in the along-the-track direction, with the leading shield being located on the opposite side of the write pole end from the trailing shield in the along-the-track direction. The leading shield may be connected to a return pole, and may have a surface that is tapered in the direction toward the recording medium.

The invention is also a perpendicular magnetic recording system that incorporates the write head.

For a fuller understanding of the nature and advantages of the present invention, reference should be made to the following detailed description taken together with the accompanying figures.

DETAILED DESCRIPTION OF THE INVENTION

Figure 1A:
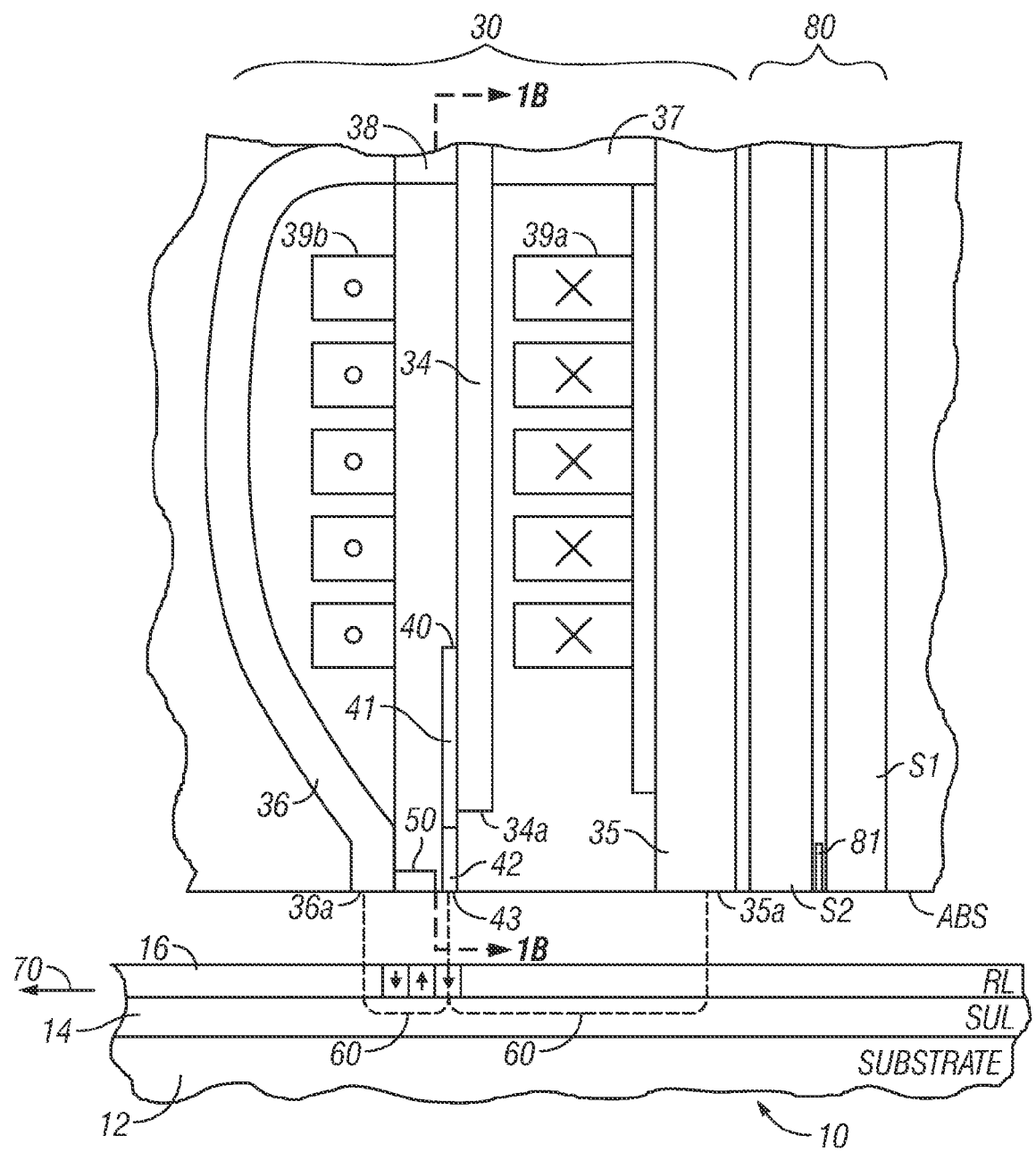
FIG. 1A is a side sectional view of a prior art perpendicular magnetic recording system showing a read head, a write head, and a recording medium taken through a plane parallel to a data track.

As shown in FIG. 1A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a magnetoresistive (MR) read head 80 and a single write pole type of recording or write head 30 that are shown in a section taken through a plane parallel with a data track on medium 10. The MR read head 80 includes the MR sensor 81 located between MR shields S1, S2.

The write head 30 includes a yoke made up of the main pole 34, a first flux return pole 35, and yoke stud 37 connecting the main pole 34 and first return pole 35, a second flux return pole 36, and yoke stud 38 connecting the main pole 34 and second return pole 36; and a thin film coil 39a, 39b shown in section around main pole 34. A flared write pole (WP) 40 is part of the main pole 34 and has a flared portion 41 and a pole tip 42 with an end 43 that faces the outer surface of medium 10. Write current through coil 39a, 39b induces a magnetic field (shown by dashed line 60) from the WP 40 that passes through the RL 16 (to magnetize the region of the RL 16 beneath the WP 40), through the flux return path provided by the SUL 14, and back to the return poles 35, 36. In a magnetic recording disk drive implementation, the recording head is typically formed on an air-bearing slider that has its air-bearing surface (ABS) supported above the surface of medium 10, which is a rotatable magnetic recording disk with concentric circular data tracks. The pole tip end 43 is located substantially at the ABS, and the first and second return poles, 35, 36 have ends 35a, 36a, respectively, that are located substantially at the ABS and thus generally coplanar with pole tip end 43. The main pole 34, on which WP 40 is formed, has an end 34a that is recessed from the ABS. In FIG. 1A, the medium 10 moves past the recording head in the direction indicated by arrow 70. The RL 16 is illustrated with perpendicularly recorded or magnetized regions, with adjacent regions having opposite magnetization directions, as represented by the arrows. The magnetic transitions between adjacent oppositely directed magnetized regions are detectable by the MR sensor 81 as the recorded bits. FIG. 1A also illustrates trailing shield (TS) 50 that forms part of a "wraparound" shield that is described in more detail in FIGS. 1B-1C.

Figure 1B:
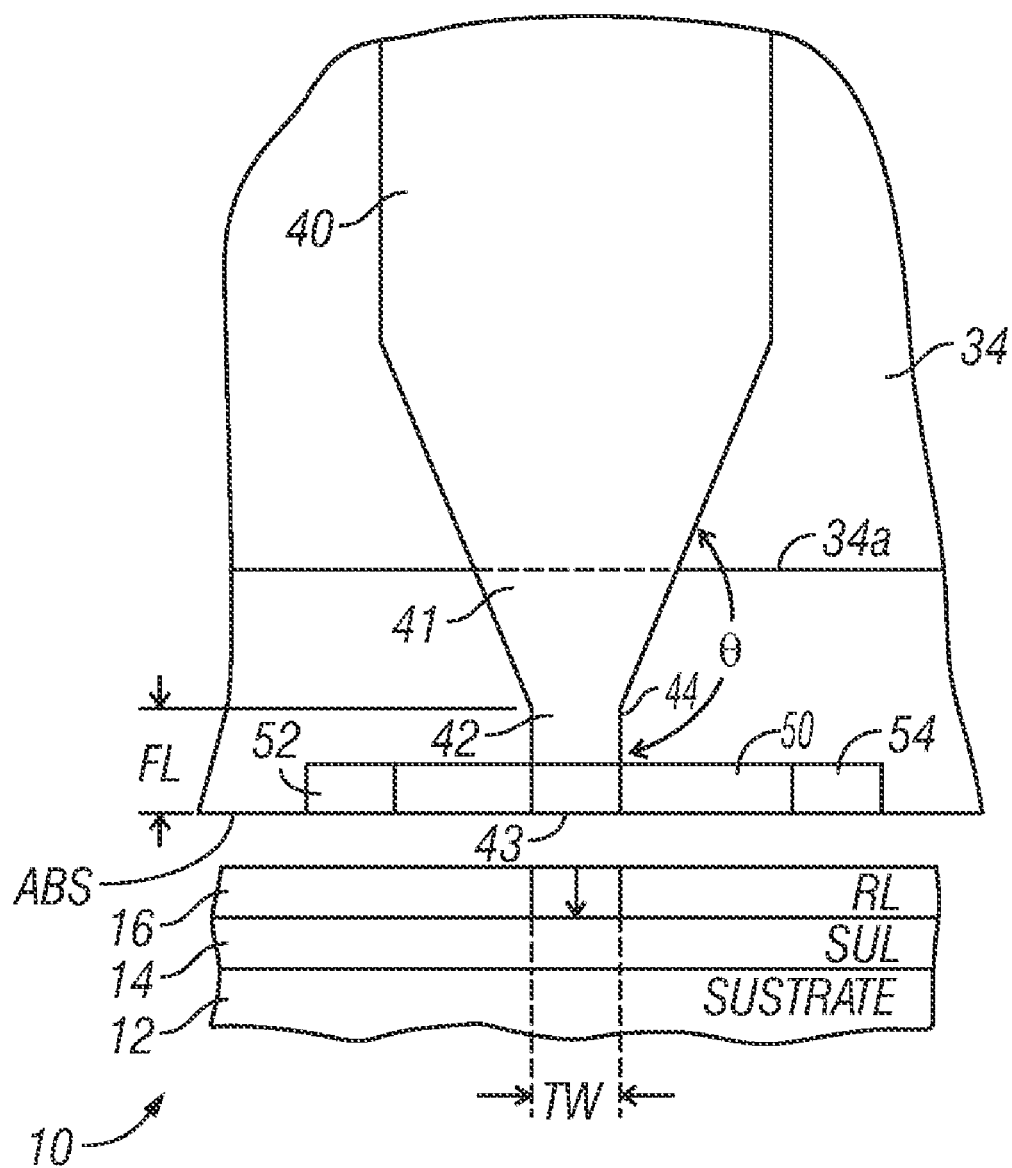
FIG. 1B is a view in the direction 1B-1B of FIG. 1A and illustrates the width of the write pole (WP) to substantially define the trackwidth (TW) of the data recorded in the recording layer (RL).

FIG. 1B is a view in the direction 1B-1B of FIG. 1A. FIG. 1B shows WP 40 formed on main pole 34 with its end 34a recessed from the ABS, and better illustrates the flare region 41 of flared WP 40. The region between the WP tip 42 and the flare portion 41 is called the flare point 44. The flare point 44 of the WP 40 is sometimes referred to as the "choke" point because it is the point where the flux density is highest and where the WP 40 saturates. The WP tip 42 has a "height" from end 43 to flare point 44 called the flare length (FL). As shown in FIG. 1B, the two side walls of WP tip 42 define its width in the cross-track direction, which substantially defines the trackwidth (TW) of the data recorded in the RL 16. The region of the WP 40 above the flare region 41 is substantially wider than WP tip 42 below the flare region 41 and the flare point 44 is the transition point where the WP 40 begins to widen with distance from the ABS. The angle θ in FIG. 1B is called the flare angle and is between 90 and 180 degrees, typically between about 120 and 150 degrees. FIG. 1B also illustrates side shields 52, 54 that form part of the wraparound shield that generally surrounds the WP tip 42.

Figure 1C:
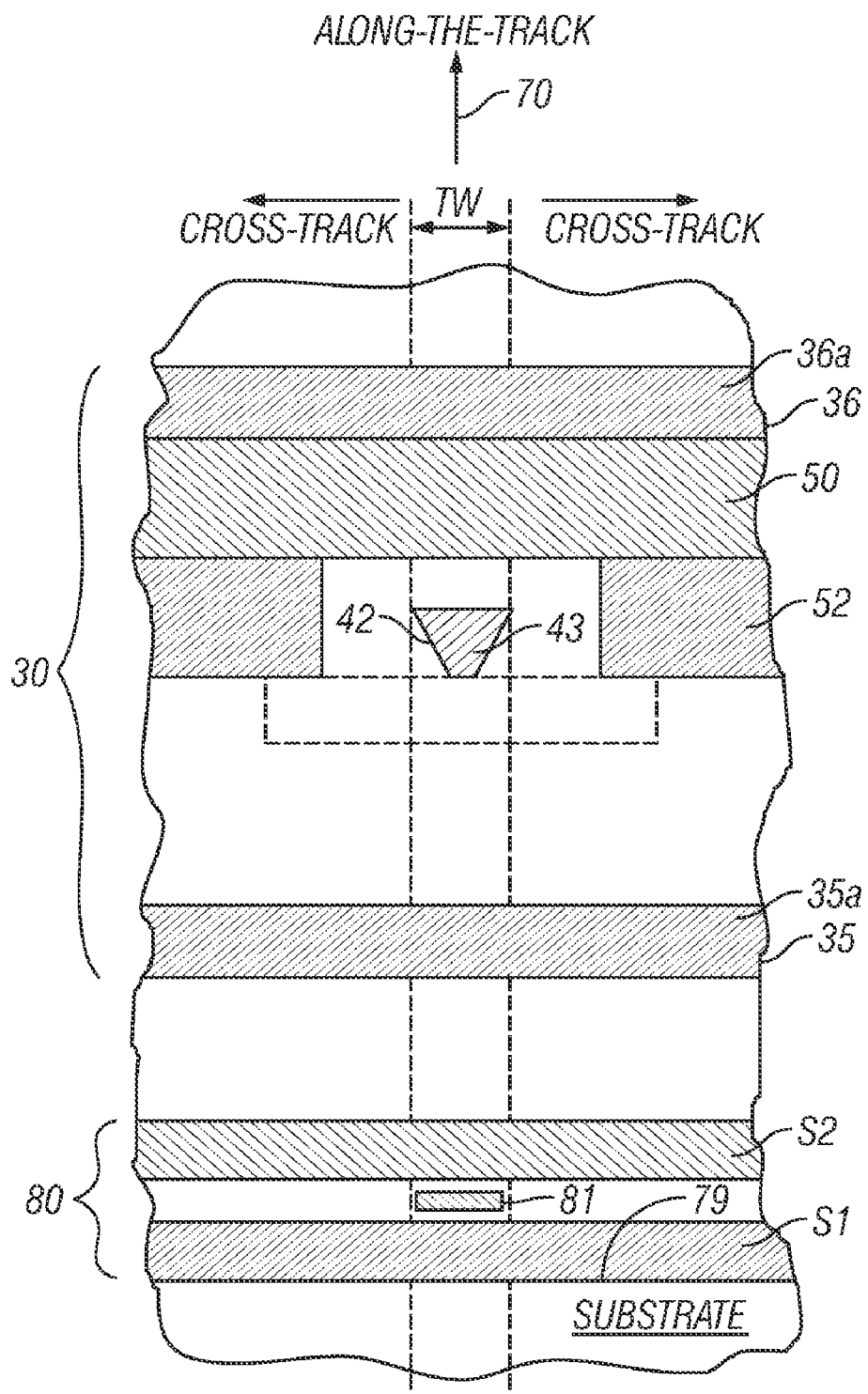
FIG. 1C is a view from the air-bearing surface (ABS) of the prior art write head in FIG. 1A and shows a wraparound shield substantially surrounding the write pole tip and connected to the return pole.

FIG. 1C illustrates the write head 30 as seen from the recording medium 10. The ABS is the recording-layer-facing surface of the slider that faces the medium 10 and is shown in FIG. 1C without the thin protective overcoat typically present in an actual slider. The recording-layer-facing surface shall mean the surface of the slider or head carrier that is covered with a thin protective overcoat, the actual outer surface of the head carrier if there is no overcoat, or the outer surface of the overcoat. The phrase "substantially at the recording-layer-facing surface" shall mean actually at the surface or slightly recessed from the surface. The recording medium 10 moves relative to the write head 30 in the direction 70, which is called the along-the-track direction. The dashed lines in FIG. 1C represent the sides of a data track. The width of the end 43 of write pole tip 42 substantially defines the track-width (TW) of the data tracks in the RL 16. The main pole 34 is shown with dashed lines because it is recessed from the ABS. The direction perpendicular to direction 70 and parallel to the plane of the ABS is called the cross-track direction.

The wraparound shield that includes side shields 52, 54 and TS 50 is described in detail as a shield for a conventional perpendicular recording head in U.S. Pat. No. 7,002,775 B2 assigned to the same assignee as this application. The shields 50, 52, 54 all have ends substantially at the recording-layer-facing surface. The shields 50, 52, 54 are typically connected to one another and substantially surround the WP pole tip 42 to from a "wraparound" shield. The TS 50 and side shields 52, 54 are separated from WP tip 42 by nonmagnetic gap material, typically alumina. The wraparound shield with shields 50, 52, 54 separated from the WP tip 42 by nonmagnetic gap material alters the angle of the write field and improves the write field gradient at the point of writing, and also shields the writing field at regions of the medium 10 away from the track being written. The wraparound shield is shown as being connected to the return pole 36 but it may also be a "floating" shield, meaning that it is not connected to either the return pole 36 or other portions of the yoke by flux-conducting material. In other variations of the write head 30, instead of a wraparound shield only a TS without side shields may be used. The TS may be either "floating" or connected to return pole 36. A perpendicular magnetic recording write head with a TS and a process for making it is described in pending application Ser. No. 11/090,456 filed Mar. 25, 2005, published as US2006/215314 A1, and assigned to the same assignee as this application.

The yoke and shields of write head 30 are formed of soft ferromagnetic material, such as alloys of NiFe, CoFe and NiFeCo that are typically formed by electroplating. The WP 40 is formed of a high-moment material, such as a high-moment CoFe alloy, that is typically formed by sputter deposition, and may be a laminated structure.

FIG. 1C also illustrates the magnetoresistive (MR) read head 80 that includes the MR sensor 81 located between MR shields S1, S2. The films making up MR head 80 and write head 30 as shown in FIG. 1C are formed in succession on a substrate, which is an end surface 79 of an air-bearing slider, by a series of thin film deposition, etching and lithographic patterning processes.

Figure 2A:
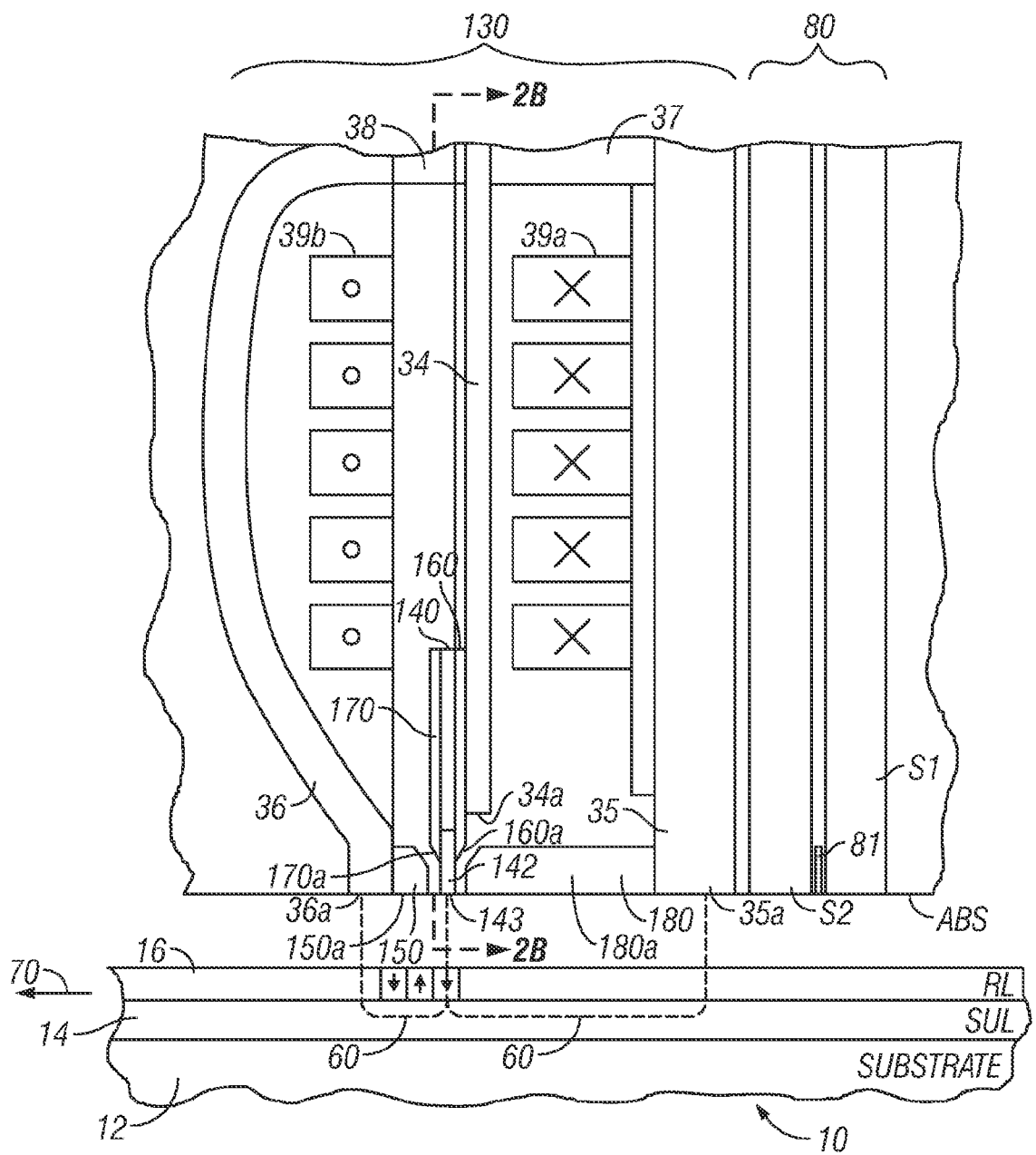
FIG. 2A is a side sectional view of a perpendicular magnetic recording system according to this invention showing a read head, a write head according to this invention, and a recording medium taken through a plane parallel to a data track.

FIG. 2A is a side sectional view of the perpendicular magnetic recording system according to this invention showing the read head 80, the write head 130 according to this invention, and the recording medium 10. The write pole (WP) 140 has a WP tip 142 with an end 143 facing the surface of RL 16 of medium 10. A first flux shaping layer 160 of magnetically permeable material like permalloy (NiFe, CoFe, or CoNiFe) is located between WP 140 and main pole 34. A second flux shaping layer 170 of magnetically permeable material like permalloy (NiFe) covers a portion of WP 140. The shaping layers 160, 170 have ends 160a, 170a, respectively, that are recessed from the end 143 of WP 140. A trailing shield (TS) 150 is located on one side of WP 140 and has an end 150a generally coplanar with end 143 of WP 140 and with the ABS. TS 150 is shown as being connected to second flux return pole 36, but TS 150 may also be a floating TS. A leading shield (LS) 180 is located on the opposite side of WP 140 from TS 150 in the along-the-track direction and has an end 180a generally coplanar with end 143 of WP 140 and with the ABS. LS 180 is connected to first flux return pole 35. FIG. 2A depicts first shaping layer 160, write pole 140 and second shaping layer 170 formed on one side of the main pole 34, specifically that side facing the second return pole 36. However, alternatively the first shaping layer 160, write pole 140 and second shaping layer 170 may be formed on the other side of the main pole 34, specifically that side facing the first return pole 35.

Figure 2B:
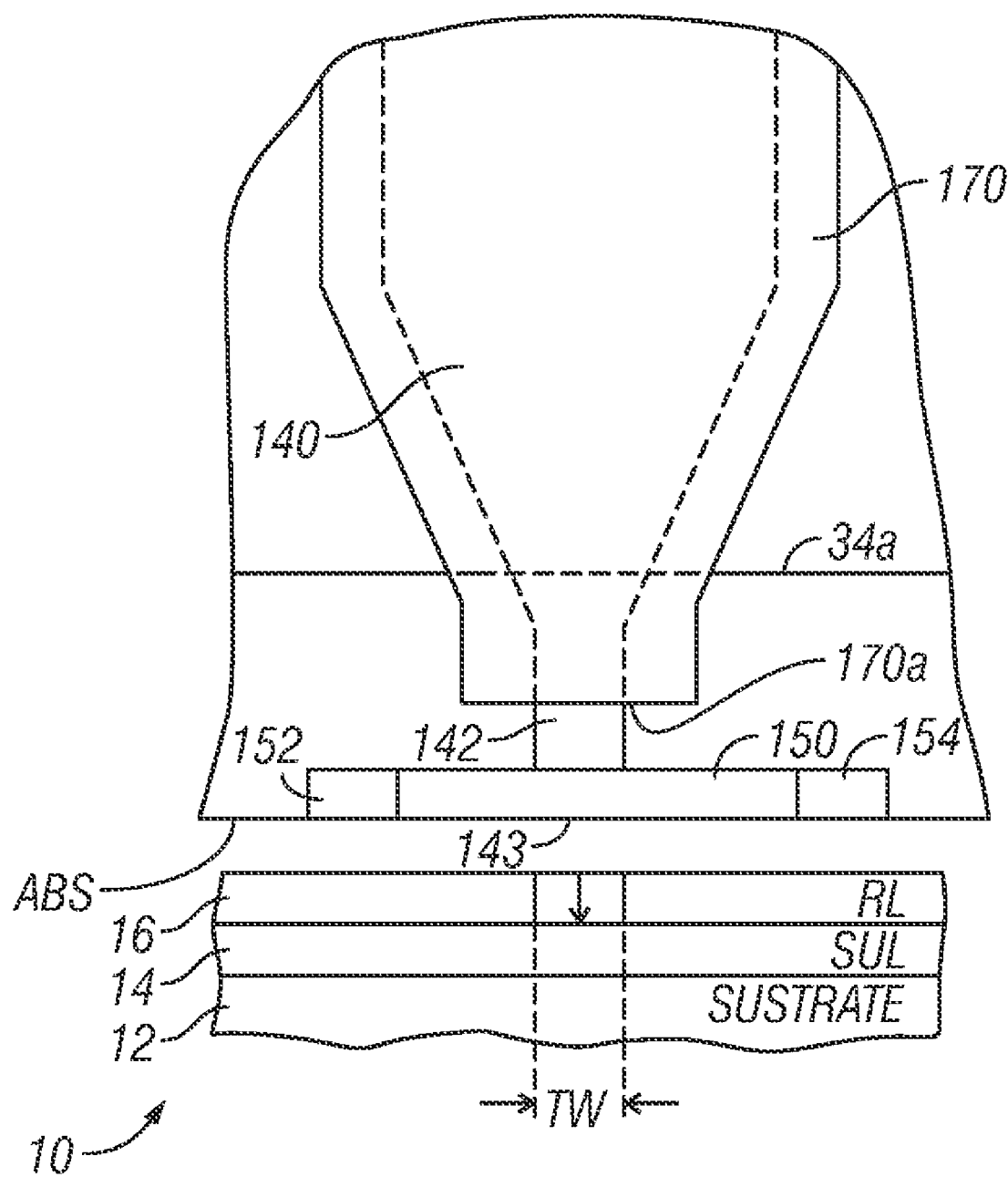
FIG. 2B is a view in the direction 2B-2B of FIG. 2A and shows the write pole with a flux shaping layer covering it.

FIG. 2B is a view in the direction 2B-2B of FIG. 2A. FIG. 2B shows WP 140 formed in dashed line with shaping layer 170 covering it. The end 170a of shaping layer 170 is located closer to the ABS than the end 34a of main pole 34. FIG. 2B also illustrates side shields 152, 154 that, together with TS 150, form the wraparound shield that generally surrounds the WP tip 142. The wraparound shield may be connected to the return pole 36 but may also be a floating shield.

Figure 2C:
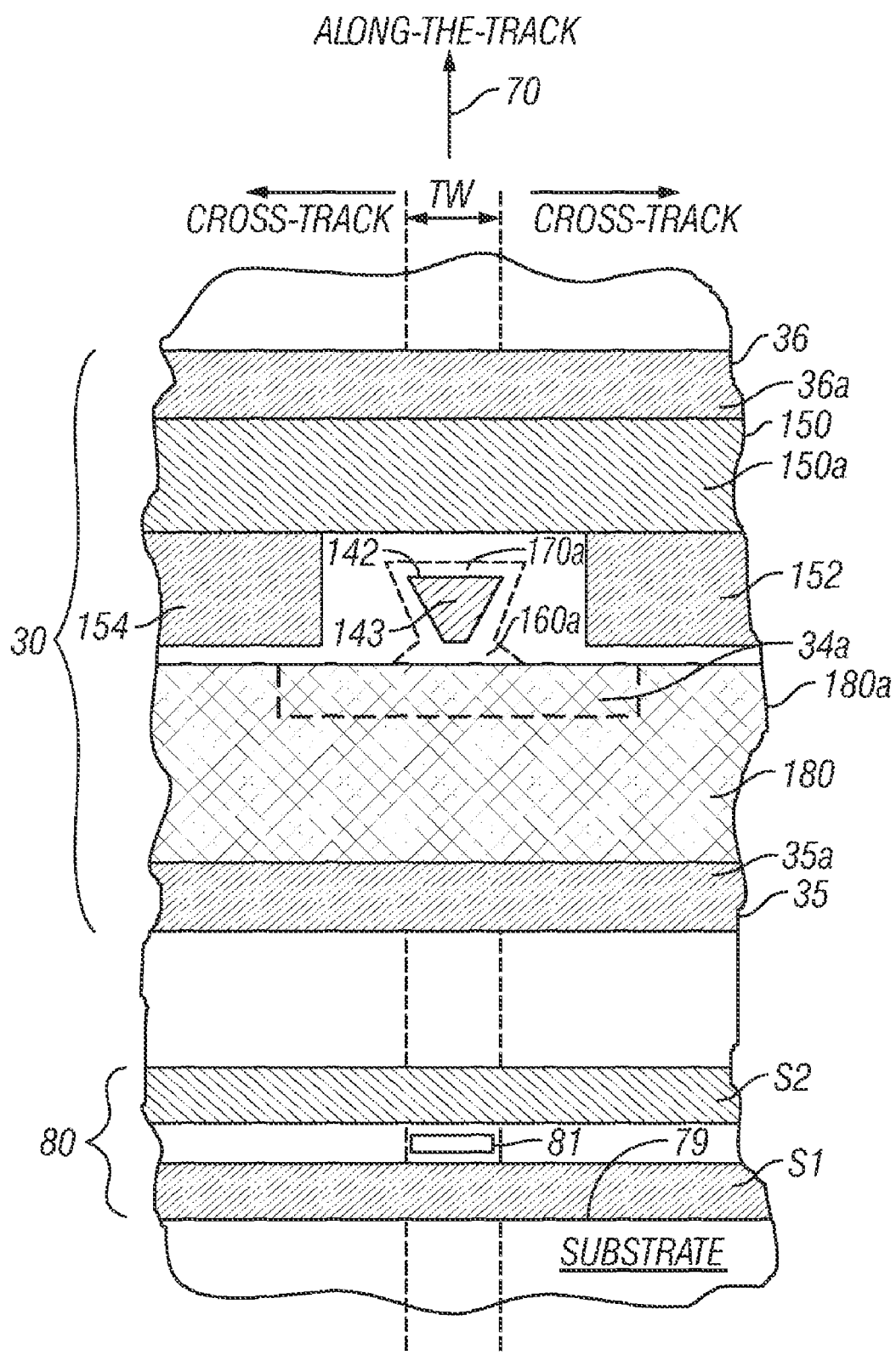
FIG. 2C is a view from the ABS of the write head of FIG. 2A.

FIG. 2C illustrates the write head 130 as seen from the recording medium 10. The ABS is the recording-layer-facing surface of the slider that faces the medium 10 and is shown in FIG. 2C without the thin protective overcoat typically present in an actual slider. The end 160a of shaping layer 160 and the end 170a of shaping layer 170, as well as the end 34a of main pole 34 are all shown in dashed lines because they are recessed from the end 143 of WP 142. LS 180 is shown as being connected to first return pole 35.

Figure 3:
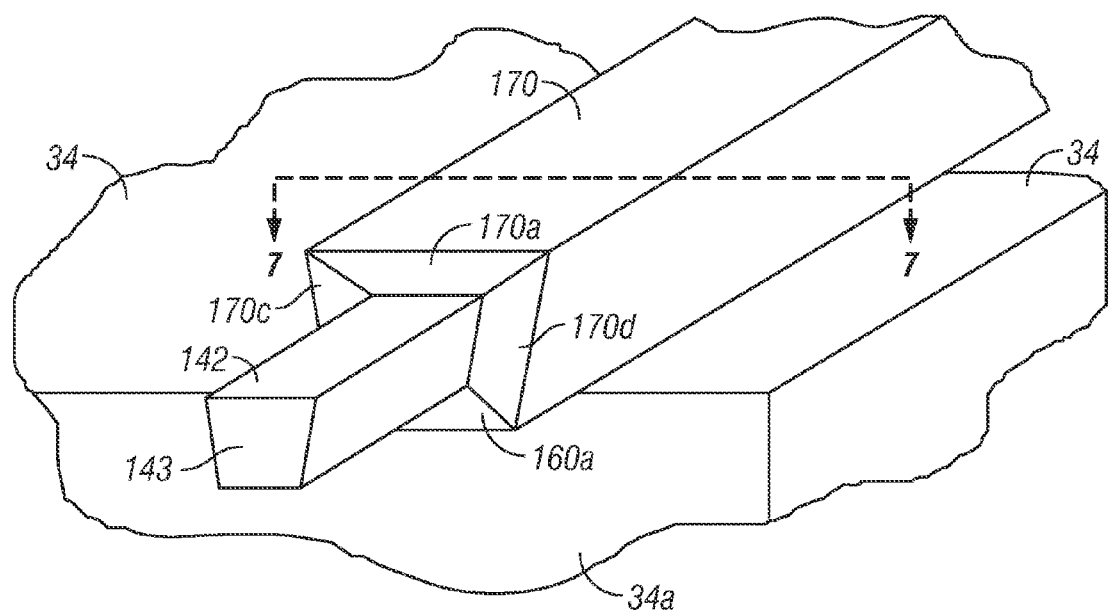
FIG. 3 is a perspective view of the write pole and flux shaping layers formed on the main pole for the write head of this invention.

FIG. 3 is a perspective view of the WP 142 and flux shaping layers 160, 170 formed on main pole 34. Also shown in FIG. 3 are side layers 170c, 170d of magnetically permeable material like permalloy (NiFe) that result from deposition of shaping layer 170 over WP 142. As a result, the WP 142 is essentially surrounded by flux shaping material.

Figure 4:
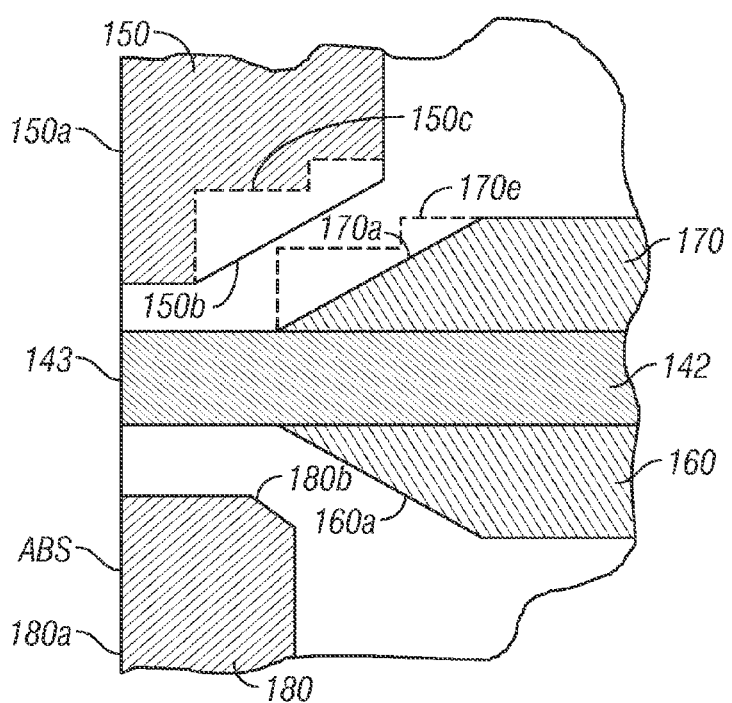
FIG. 4 is an enlarged view of a portion of FIG. 2A showing the write pole tip, the flux shaping layers, and the leading and trailing shields near the ABS.

FIG. 4 is an enlarged view of a portion of FIG. 2B showing the WP tip 142, shaping layers 160, 170, LS 180 and TS 150 near the ABS. Preferably, shaping layer 160 has an end 160a that is tapered in the direction of the ABS. Similarly, shaping layer 170 preferably has a end 170a that is tapered in the direction of the ABS. The tapered ends 160a, 170a assist in directing and shaping the flux to the end 143 of WP 142. LS 180 also preferably has a tapered surface 180a that is tapered in the direction of the ABS. TS 150 also preferably has a tapered surface 150a that is tapered in the direction of the ABS. Because of the difficulty in fabricating a smooth tapered surface on TS 150, the tapered surface 150a of TS 150 may be a series of discrete steps, as shown by dashed line 150c. If the tapered surface 150a of TS 150 is a series of discrete steps, the tapered surface 170a may also be a series of tapered steps, as shown by dashed line 170e.

Figure 5A:
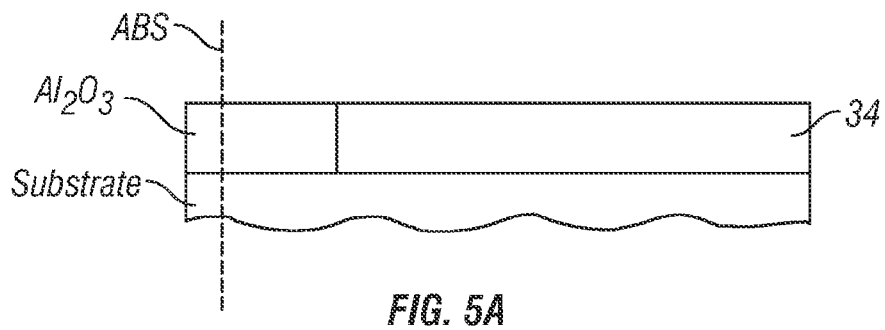
FIGS. 5A-5H are sectional views illustrating the process of making the write head according to this invention.
Figure 5B:
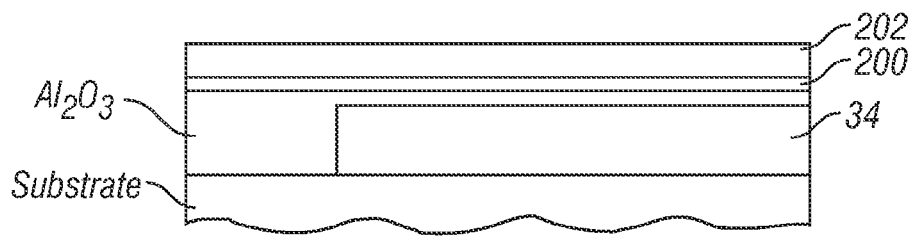
Figure 5C:
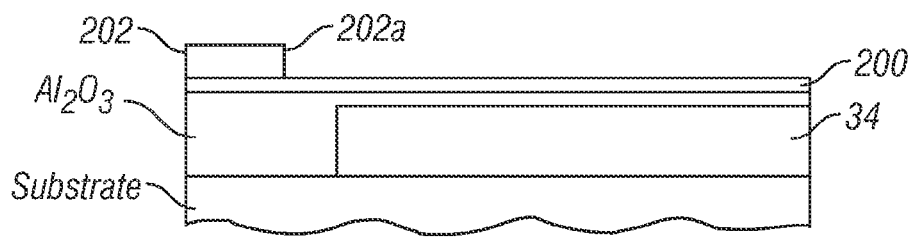
Figure 5D:
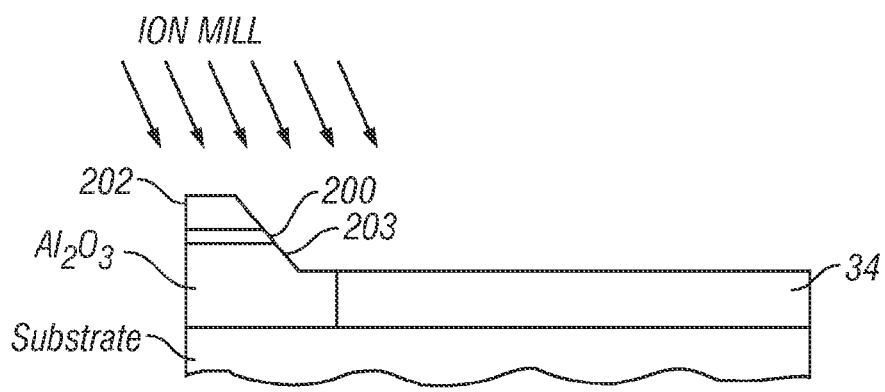
Figure 5E:
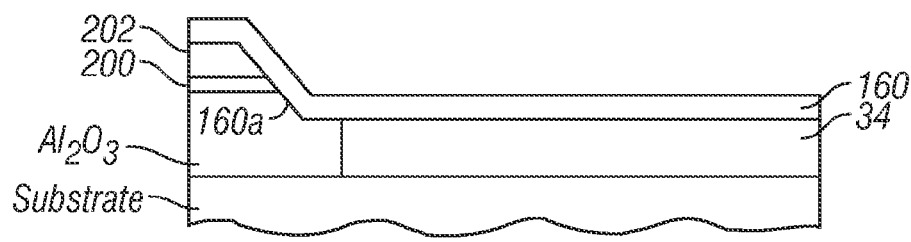
Figure 5F:
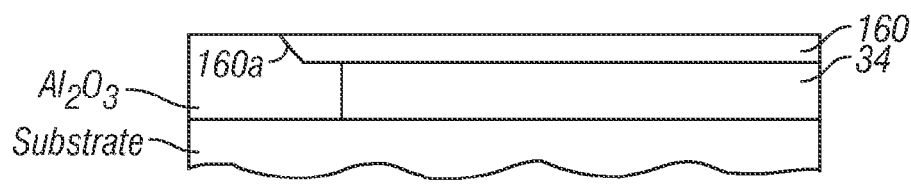
Figure 5G:
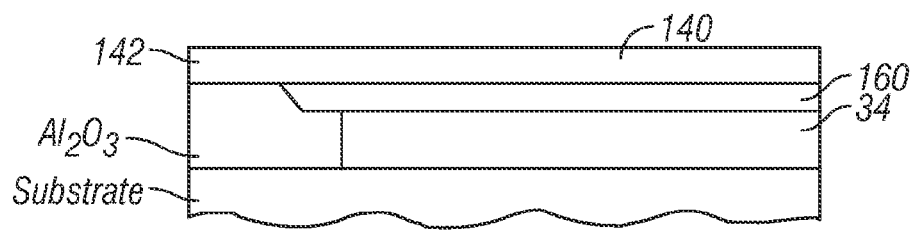
Figure 5H:
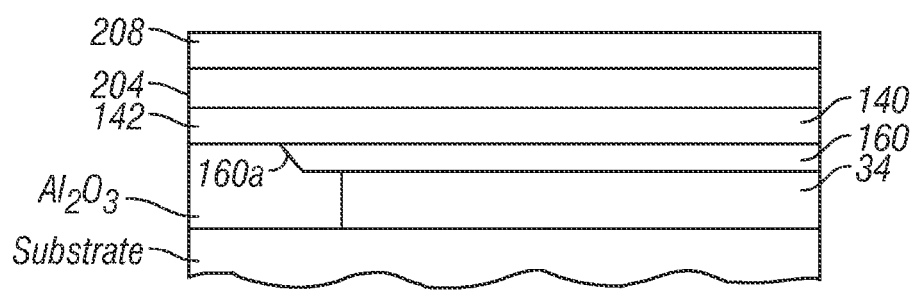

FIGS. 5A-5H are sectional views illustrating the process of making the write head according to this invention. In FIG. 5A, the main pole 34 and the end alumina ($Al_2O_3$) region (that region near the ABS where the side shields and TS will later be formed) have been deposited on the substrate, which is also typically alumina ($Al_2O_3$). FIG. 5A shows the result after chemical-mechanical polishing (CMP) of the main pole 34. In FIG. 5B, a CMP stop layer 200 is deposited, following by photoresist 202. In FIG. 5C the photoresist 202 has been patterned to define an edge 202a that will subsequently define the end 160a of shaping layer 160. In FIG. 5D, ion milling has been performed at an oblique angle of incidence to remove CMP stop layer 200 in the unprotected region above main pole 34, which leaves a tapered surface 203 on the end alumina portion. If a tapered end 160a of first shaping layer 160 (see FIG. 4) is not desired, the ion milling can be performed at normal incidence. In FIG. 5E, the first shaping layer 160 has been deposited on main pole 34 with tapered end 160a above the end alumina region. Shaping layer 160 is preferably deposited by sputter deposition to a thickness of about 10 nm to 100 nm and is formed of magnetically permeable material, like NiFe, CoNiFe, or CoFe. In FIG. 5F, CMP has been performed to remove remaining photoresist 202 and a portion of shaping layer 160, and then CMP stop layer 200 has been removed. This leaves shaping layer 160 with tapered end 160a on main pole 34. In FIG. 5G, WP 140 has been deposited over shaping layer 160. WP 140 is preferably a laminated layer of high-moment material, like CoFe, and is formed by sputter deposition to a thickness of about 100 nm to 200 nm. In FIG. 5H, a layer of hard mask 204 (such as $Al_2O_3$, DLC, or SiC) is deposited over WP 140, followed by a layer of photoresist 208. Photoresist layer 208 is patterned to define the shape of WP 140 with WP tip 142, and underlying shaping layer 160 underlying main pole 34, with the resulting shape being generally as shown in FIG. 2B.

Figure 6A:
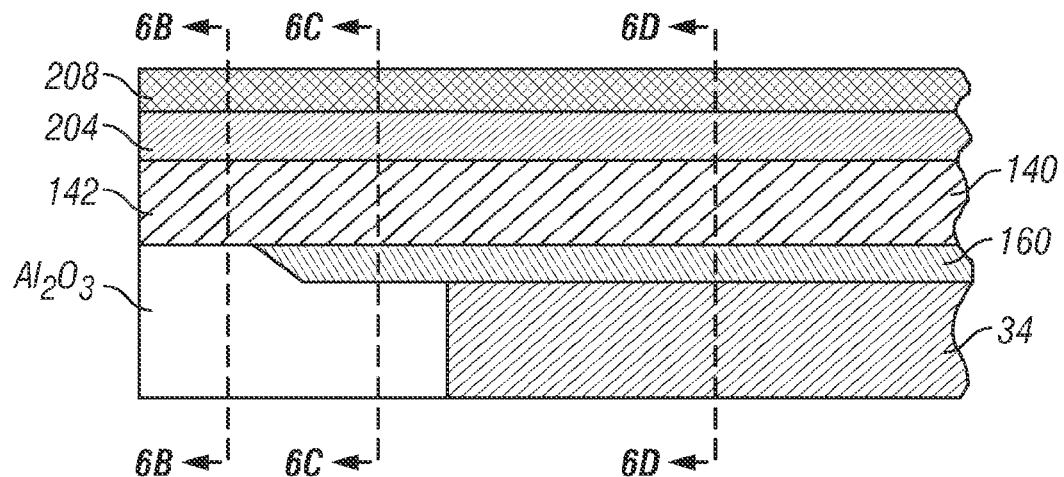
FIG. 6A illustrates the result after the structure shown in FIG. 5H has been etched through patterned photoresist to form the write pole above the flux shaping layer and main pole.
Figure 6B:
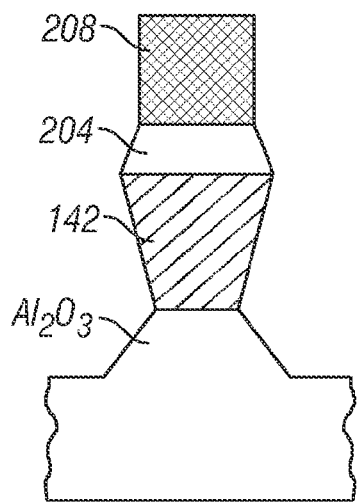
FIGS. 6B, 6C and 6D are sectional views of FIG. 6A at three different regions, respectively, of the write pole.
Figure 6C:
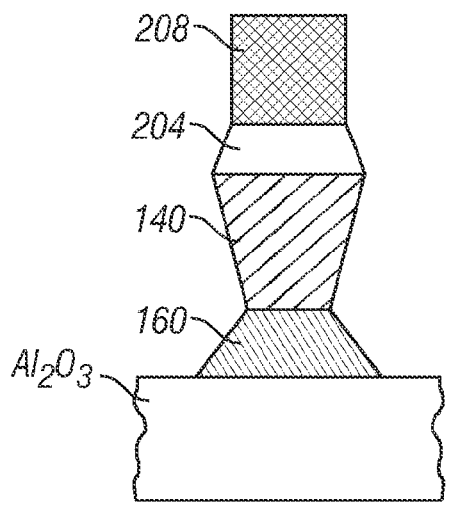
Figure 6D:
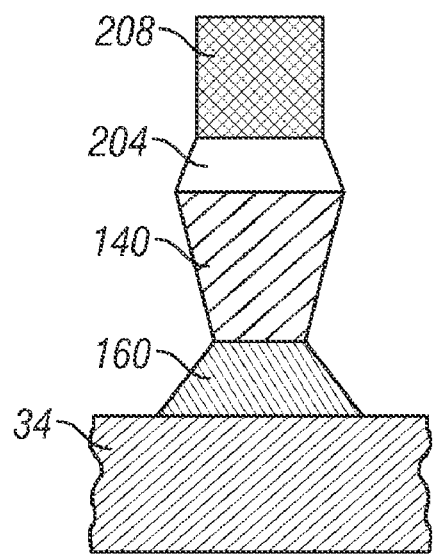

FIG. 6A and its three different sectional views (FIGS. 6B, 6C and 6D) illustrate the result after the structure of FIG. 5H has been etched through the patterned photoresist 208. FIG. 6B is a sectional view through WP tip 142 which does not have shaping layer 160 or main pole 34 below it. FIG. 6C is a sectional view through the portion of WP 140 that has underlying shaping layer 160, but no underlying main pole 34. FIG. 6D is a sectional view through the portion of WP 140 that has both underlying shaping layer 160 and underlying main pole 34.

Figure 7:
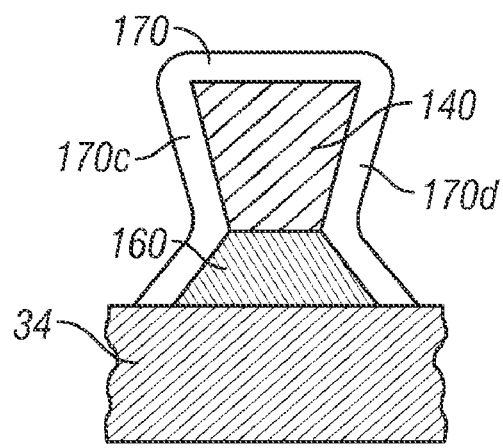
FIG. 7 shows the structure of FIG. 6D after formation of the flux shaping layers, and is a view of section 7-7 of the perspective view of FIG. 3.

FIG. 7 shows the structure of FIG. 6D after removal of photoresist 208 and hard mask 204 (such as $Al_2O_3$, DLC, or SiC), and following deposition of shaping layer 170, which also covers the sides of WP 140 at region 170c, 170d. FIG. 7 is also essentially a view of section 7-7 of the perspective view of FIG. 3. Shaping layer 170 is formed of magnetically permeable material, like NiFe, CoNiFe or CoFe, and is preferably deposited by sputtering to a thickness in the range of about 10 nm to 100 nm. Side regions 170c, 170d of flux shaping material are thus located on opposite sides of the WP 140 in the cross-track direction. As a result, as shown in FIG. 7, WP 140 is substantially surrounded by flux shaping material.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write head for magnetizing regions in data tracks of a magnetic recording layer comprising:
a write pole having an end for facing the recording layer;
a main pole connected to the write pole and having an end recessed from the write pole end;
a first flux shaping layer of magnetically permeable material located between the main pole and the write pole and having an end recessed from the write pole end;
an electrically conductive coil wrapped around the main pole for generating magnetic flux in the main pole and its connected write pole;
first and second return poles spaced on opposite sides of the write pole in the along-the-track direction; and
a trailing shield having an end generally coplanar with the write pole end and spaced from the write pole end in the along-the-track direction.

2. The write head of claim 1 further comprising a leading shield having an end generally coplanar with the write pole end and spaced from the write pole end in the along-the-track direction, the leading shield being located on the opposite side of the write pole from the trailing shield in the along-the-track direction.

3. The write head of claim 2 wherein said leading shield end is tapered in the direction toward the recording layer.

4. The write head of claim 2 wherein the return poles are connected to the main pole by a yoke and wherein the leading shield is connected to said first return pole.

5. The write head of claim 1 wherein said trailing shield end is tapered in the direction toward the recording layer.

6. The write head of claim 1 wherein the return poles are connected to the main pole by a yoke and wherein the trailing shield is a floating shield not connected to the return poles or the yoke.

7. The write head of claim 1 wherein the return poles are connected to the main pole by a yoke and wherein the trailing shield is connected to said second return pole.

8. The write head of claim 1 further comprising a pair of side shields having ends generally coplanar with the write pole end and spaced on opposite sides from the write pole end in the cross-track direction.

9. The write head of claim 8 wherein the side shields and trailing shield are contiguous, thereby forming a wraparound shield.

10. The write head of claim 9 wherein the return poles are connected to the main pole by a yoke and wherein the wraparound shield is a floating shield not connected to the return poles or the yoke.

11. The write head of claim 9 wherein the return poles are connected to the main pole by a yoke and wherein the wraparound shield is connected to said second pole.

12. The write head of claim 1 wherein said end of the first shaping layer is tapered in the direction toward the recording layer.

13. The write head of claim 1 further comprising a second flux shaping layer of magnetically permeable material located on said write pole and having an end recessed from the write pole end.

14. The write head of claim 13 wherein said end of the second shaping layer is tapered in the direction toward the recording layer.

15. The write head of claim 13 further comprising magnetically permeable material located on opposite sides of the write pole in the cross-track direction, whereby the write pole is substantially surrounded by and in contact with magnetically permeable material in its region recessed from its end facing the recording layer.

16. A magnetic recording disk drive perpendicular recording write head for magnetizing regions in data tracks of a magnetic recording layer on the disk, the head being formed on a slider having an air-bearing surface (ABS) for facing the recording layer and comprising:
 a substrate;
 a main pole on the substrate and having an end recessed from the ABS;
 a first flux shaping layer of magnetically permeable material on the main pole and having an end recessed from the ABS;
 a write pole on the first shaping layer and having an end substantially at the ABS;
 a second flux shaping layer of magnetically permeable material on the write pole and having an end recessed from the ABS;
 an electrically conductive coil wrapped around the main pole for generating magnetic flux in the main pole and its connected write pole;
 first and second return poles spaced on opposite sides of the write pole in the along-the-track direction;
 a leading shield having an end substantially at the ABS and located between the write pole end and the first return pole and spaced from the write pole end in the along-the-track direction; and
 a trailing shield having an end substantially at the ABS and located between the write pole end and the second return pole and spaced from the write pole end in the along-the-track direction.

17. The disk drive of claim 16 wherein said ends of said first and second shaping layers are tapered in the direction of the ABS.

18. The disk drive of claim 16 further comprising magnetically permeable material located on opposite sides of the write pole in the cross-track direction and connecting the first and second shaping layers, whereby the write pole is substantially surrounded by and in contact with magnetically permeable material in a region recessed from its end at the ABS.

19. The disk drive of claim 16 further comprising a pair of side shields having ends substantially at the ABS and spaced on opposite sides from the write pole end in the cross-track direction.

20. The write head of claim 19 wherein the side shields and trailing shield are contiguous, thereby forming a wraparound shield.

21. A magnetic recording disk drive comprising:
 a rotatable magnetic recording disk comprising a substrate, an underlayer on the substrate, and a recording layer on the underlayer, the recording layer having a plurality of circular concentric data tracks; and
 the write head of claim 16.

\* \* \* \* \*